US006332686B1

(12) United States Patent
Yoda

(10) Patent No.: US 6,332,686 B1
(45) Date of Patent: Dec. 25, 2001

(54) KALEIDOSCOPE

(75) Inventor: Yuriko Yoda, Tokyo (JP)

(73) Assignee: Ochi International KabuShiki Kaisha, Fukuroi (JP)

( * ) Notice: Subject to any disclaimer, the term of this patent is extended or adjusted under 35 U.S.C. 154(b) by 0 days.

(21) Appl. No.: 09/202,829

(22) PCT Filed: Feb. 2, 1998

(86) PCT No.: PCT/JP98/00429

§ 371 Date: Jul. 14, 1999

§ 102(e) Date: Jul. 14, 1999

(87) PCT Pub. No.: WO98/48311

PCT Pub. Date: Oct. 29, 1998

(30) Foreign Application Priority Data

Apr. 22, 1997 (JP) .................................................. 9-003133

(51) Int. Cl.[7] ............................ G02B 27/08; A63H 33/22

(52) U.S. Cl. ............................................ 359/617; 446/219

(58) Field of Search .................................... 359/616, 617; 446/219

(56) References Cited

U.S. PATENT DOCUMENTS 3,692,382 * 9/1972 Cloutier .................................. 350/5
3,809,879 * 5/1974 Gonzalez .............................. 240/3.1
3,885,865 * 5/1975 Stern et al. ............................. 353/2
4,158,982 * 6/1979 Chusid .................................. 84/464
4,259,808 * 4/1981 Oakes .................................... 46/240
4,776,653 * 10/1988 Kaplan ................................. 350/4.1
5,054,865 * 10/1991 Huang ................................. 359/617
5,225,934 * 7/1993 Kroll .................................... 359/616
5,469,297 * 11/1995 Marshall et al. ..................... 359/617
5,546,226 * 8/1996 Herington ............................ 359/616
5,569,511 * 10/1996 Spector ................................. 428/11
5,577,947 * 11/1996 Malloy et al. ....................... 446/220
5,786,938 * 7/1998 Chang ................................. 359/617
5,873,766 * 2/1999 Burton ................................ 446/421
5,984,480 * 11/1999 Wong .................................. 359/617

FOREIGN PATENT DOCUMENTS 48638 10/1980 (JP) .
78266 12/1982 (JP) .
57-190519 * 12/1982 (JP) .............................. G02B/27/08
4-114123 4/1992 (JP) .
3042752 8/1997 (JP) .

* cited by examiner

*Primary Examiner*—Christopher E. Mahoney
(74) *Attorney, Agent, or Firm*—Wenderoth, Lind & Ponack, L.L.P.

(57) ABSTRACT

A kaleidoscope which is characterized in that it comprises a hollow box (10) having peep holes (12 and 13) in one of its side walls, polygonal hollow cylinders (31A and 31B) each of which has 1st and 2nd end surfaces, whose inner surfaces are mirror surfaces and which are so provided inside hollow box (10) that they correspond to the peep holes (12 and 13) and the 1st end surfaces face the peep holes (12 and 13) with lenses (32) therebetween respectively, object cases (33A and 33B) in which objects (350) are housed and which are provided rotatably at positions where their one side walls (333) face the 2nd end surfaces of the polygonal hollow cylinders (31A and 31B), light sources (40) which face the other side walls of the object cases and are provided on the other side wall are formed at positions corresponding to the hollow box (10), a means (35, 36) which is provided in the hollow box (10) and gives rotary motions to the object cases (33A and 33B), sound sources which are provided in the hollow box (10) and the control means (15) which is connected to the means (35, 36), the light sources (40) and the sound sources (38 and 39) and controls their operations.

8 Claims, 3 Drawing Sheets

43 15 34 33A 41 40 31A 12 32 33B 38 40 13 35 32 17 10 31B 11 39 36 11

KALEIDOSCOPE

TECHNICAL FIELD

The present invention relates to a kaleidoscope that allows the user to change, in various ways or manners, the forms of motion or movement of visual objects within the kaleidoscope, that is, small pieces such as pieces of colored paper, pieces of colored glass and the like, and to thereby enjoy looking at the complicately and variously changing patterns that can be perceived by reflection in the inner wall mirrors of the hollow cylinders forming the kaleidoscope, as well as to enjoy those complicately and variously changing patterns while listening to music and melody.

BACKGROUND ART

Typically, a kaleidoscope comprises a hollow box in which hollow cylinders of a triangle cross section having mirror surfaces on the inner sides thereof are disposed, wherein the hollow box has peepholes at one end thereof and contains visual objects such as small pieces of colored paper, small pieces of colored glass, and the like at the other end thereof The kaleidoscope allows the user to enjoy looking at the color patterns and the changes in the color patterns that appear by reflection in the mirrors and can be observed through the peepholes, by rotating the hollow cylinders to cause those small pieces of colored paper, small pieces of glass and the like to move around therein.

The kaleidoscope of the type described above that has improved its ornamental outlook is known, as disclosed in the Japanese Utility Model patent now registered under In the conventional kaleidoscope, most of the changing forms of the patterns produced by the motion or movement of the objects can only be provided by rotating the hollow cylinders. In addition, it allows the user only to observe those changing patterns through the peepholes visually. No kaleidoscope has yet been proposed that allows the user to satisfy the needs of listening to a particular sound like music and smelling the fragrance of a particular perfume as well, while observing the visual patterns.

DISCLOSURE OF THE INVENTION

The kaleidoscope proposed by the present invention includes a hollow box having peepholes on one lateral wall thereof, polygonal hollow cylinders each having first and second end sides whose inner surfaces form mirror surfaces, each of the polygonal hollow cylinders being disposed inside the hollow box so that it corresponds to each respective one of the peepholes and that the first end side faces opposite the associated peephole with a lens interposed there between, object cases in which objects are housed, each of the object cases being disposed rotatably at the position where its one lateral wall is located opposite the second end side of the corresponding polygonal hollow cylinder, light sources each of which is disposed on the inner side of the other lateral wall opposite the one lateral wall of the hollow box and located at the position where it faces opposite the other lateral wall of the associated object case, means provided inside the hollow box and operated to supply the rotary motion to the object cases, a sound source provided inside the hollow box, and a central controller means coupled with each of the rotary supply means, the light sources and the sound source for controlling the respective operation thereof. According to the kaleidoscope of the invention, the user can enjoy the continually changing patterns of the objects both visually and acoustically, by rotating the object cases to cause the rotary motion of the objects therein and to thereby cause those objects to move around therein, and by playing music in synchronism with the rotary motion of the object cases while the objects are moving around.

In the kaleidoscope described above, the means for supplying the rotary motion to the object cases may be operated electrically or manually.

In order to allow the user to enjoy the color patterns or the complicate and various changes in those color patterns that are produced by the variously changing motions or movements of the objects and can be perceived visually by reflecting those motions or movements in the mirrors, the method and means for supplying the motion to the objects may be implemented in various ways other than rotating the object cases as the before described, which will be described in the following section "Best Mode for carrying out the Invention".

BEST MODE FOR CARRYING OUT THE INVENTION

Several particular embodiments of the present invention are now described by way of example by referring to the accompanying drawings.

Figure 1:
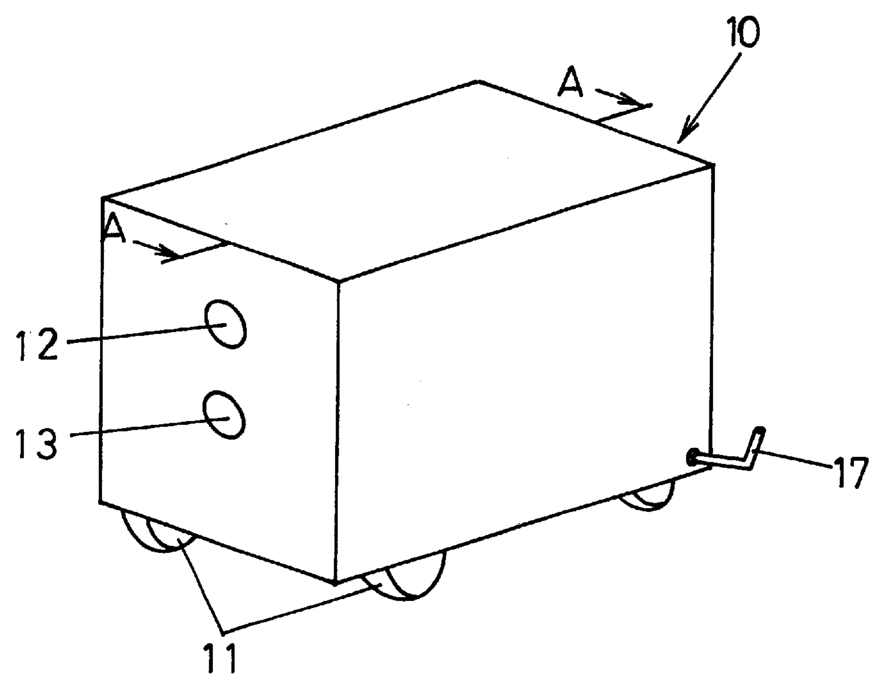
FIG. 1 is a perspective view illustrating a preferred embodiment of the kaleidoscope according to the present invention.

Referring first to FIG. 1, there is a rectangular hollow box 10 equipped with casters 11 on the bottom that permit the box 10 to travel freely. On one lateral side wall of the box 10, it has a first peephole 12 and a second peephole 13 located below the first peephole 12. The box 10 further includes a manually-operated handle 17 which is provided on one transversal side, extending outwardly from inside the box, and a central controller 15 that is located on the other transversal side.

Figure 2:
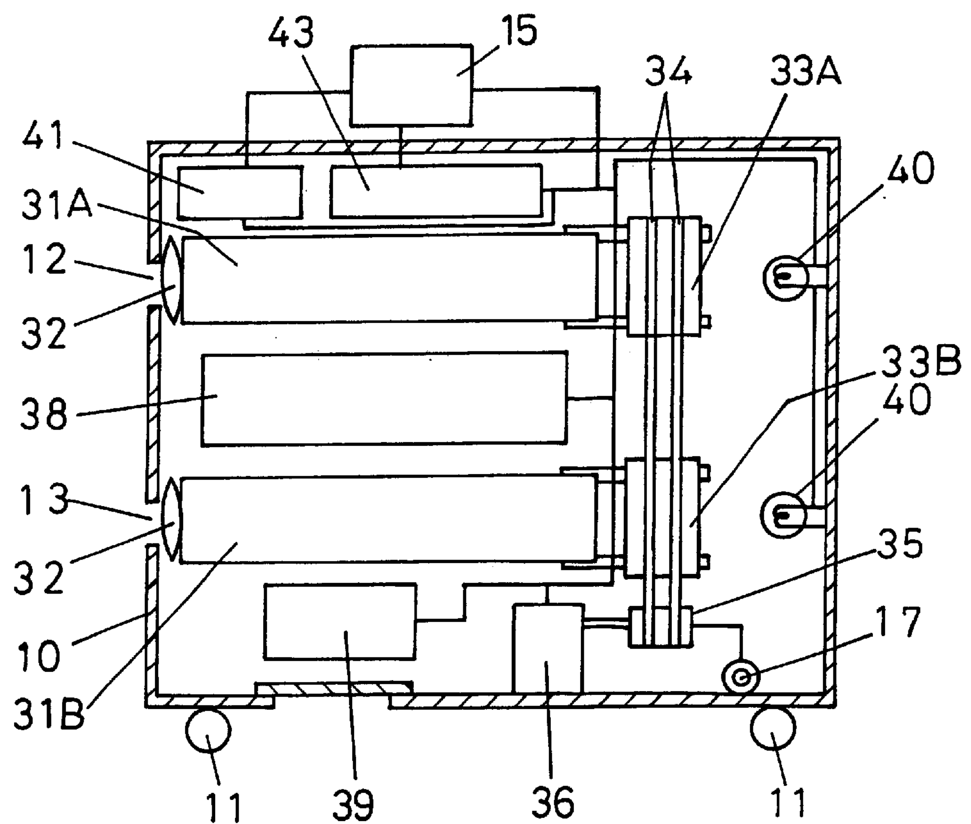
FIG. 2 is a sectional view of the kaleidoscope of FIG. 1 taken along the line A—A in FIG. 1, illustrating the internal arrangement of the kaleidoscope.

Referring to FIG. 2, the rectangular hollow box 10 contains polygonal hollow cylinders 31A, 31B arranged in parallel and opposite each other, each of which has its one end side facing opposite each respective one of the first and second peepholes 12 and 13. Lenses 32, 32 are interposed between the polygonal hollow cylinders 31A, 31B and the corresponding peepholes 12, 13, respectively. Although it is shown that those lenses 32, 32 are interposed between the peepholes 12, 13 and the end sides of the polygonal hollow cylinders 31A, 31B facing opposite the peepholes, it should be understood that the lenses may be fitted into the end sides of the polygonal hollow cylinders 31A, 31B facing opposite the peepholes 12, 13, or may be mounted or attached around the peripheral edges of the end sides.

Specifically, each of the polygonal hollow cylinders 31A, 31B is composed of a set of three mirror plates whose mirror sides are directed inside for providing mirror surfaces and which are combined into a cylindrical hollow shape having a triangular cross section. At the other end side of each of the polygonal hollow cylinders 31A, 31B opposite the end side thereof at which each respective one of the peepholes 12, 13 is provided, there is a respective object case 33A, 33B which is so mounted rotatably as to face opposite the other end side of the respective polygonal hollow cylinder 31A, 31B.

Each of the object cases 33A, 33B contains visual objects such as pieces of multicolors, including pieces of colored paper, pieces of colored glass, colored stones, and the like.

Figure 3:
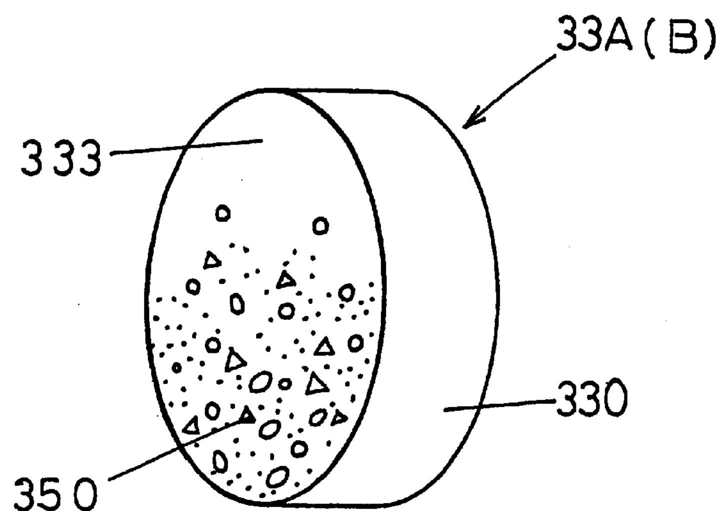
FIG. 3 is a perspective view illustrating the object case.

As shown in FIG. 3, each of the object cases 33A, 33B comprises a casing 330 having transparent plates 333, 333 on the opposite lateral sides thereof, in which the objects 350 such as pieces of multicolors including pieces of colored paper, pieces of colored glass, colored stones and the like are housed so that they can be moving around freely therein. Specifically, the transparent plates 333, 333 for each of the object cases 33A, 33B are provided so that one of the transparent plates 333, 333 faces opposite the end side of the respective polygonal hollow cylinder 31A, 31B opposite the end side thereof at which the respective peephole 12, 13 is located, while the other transparent plate faces opposite a respective light source 40, 40 that is disposed on the inner side of the lateral wall of the rectangular hollow box 10 opposite the lateral wall thereof on which the respective peephole 12, 13 are provided (FIG. 2).

The object cases 33A, 33B are coupled with a pulley 35 by way of a belt 34. The pulley 35 may be driven by a motor 36 which may be operated under control of a central controller 15 that controls the start/stop of the motor and its speed of rotation. The central controller 15 may include a dial-type switch that may control the rate of rotation for the pulley 35 by turning the switch through an appropriate angle, so that the desired speed of rotation for the object cases 33A, 33B can be obtained.

As seen from FIG. 2, the rectangular hollow box 10 accommodates a sound source 38, a speaker 39, and light sources 40, 40, all of which are connected to the central controller 15 and may be operated under control of the central controller 15.

Specifically, the central controller 15 provides appropriate instructions or commands that may control the start/stop of the motor 36, the speed of rotation for the motor and so on, and that may control the start/stop of the sound source 38, the volume of a sound through the speaker 39, the tempo and rate of music being played, and the turn on/off of the light sources 40 as well as the intensity and tone of light, concurrently with the above control for the motor 36.

The pulley 35 is connected to the motor 36, and is also connected to the manually-operated handle 17. Thus, the rotation of the object cases 33A, 33B may be controlled by rotating the handle 17 manually.

In addition, the rectangular hollow box 10 contains a cell 41 and a rechargeable battery 43. In case the external power supply is not available, the cell 41 and the rechargeable battery 43 may be used to supply power to the circuit including the central controller 15, motor 36, sound source 38, speaker 39, and light sources 40, 40.

Figure 4:
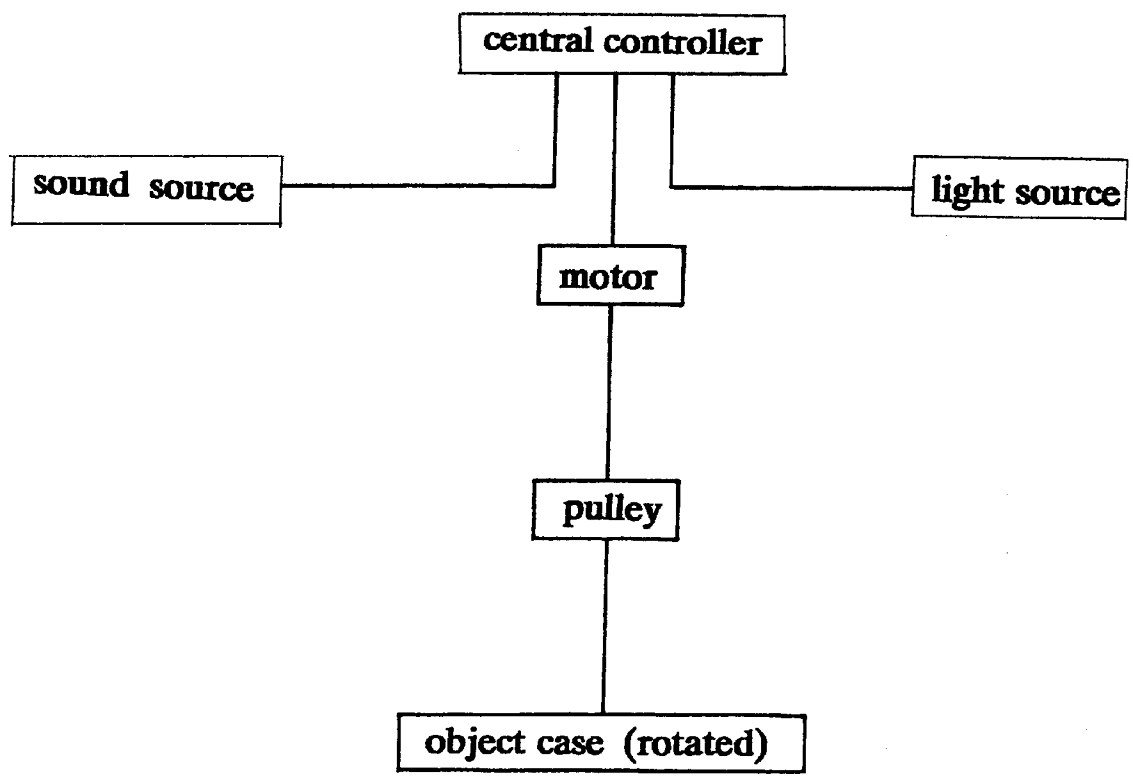
FIG. 4 is a flowchart diagram showing the operational sequence of the kaleidoscope in accordance with the present invention.

Referring next to the flowchart in FIG. 4, the operation of the kaleidoscope described above is described.

When the central controller 15 becomes operational, it turns the light sources 40, 40 on, and at the same time starts the motor 36 and activates the sound source 38 and speaker 39 through which music may be played.

The central controller 15 may be operated to control the speed of rotation for the motor 36 and therefore the pulley 35. When the pulley 35 is rotated at a particular rate, it drives the object cases 33A, 33B for rotation by way of the belt 34. Rotating the object cases 33A, 33B may cause the objects 350 therein to be moving around.

Looking into the rectangular hollow box 10 through the peephole 12 or 13, the objects 350 moving around inside the corresponding object case 33A or 33B may appear as geometrical patterns by reflection in the mirror surfaces forming the inner walls of the corresponding polygonal hollow cylinder 31A or 31B. Those geometrical patterns may appear more beautiful by being illuminated by the light source 40, 40.

If the sound source 38 is then operated in synchronism with the rotating of object case 33A, 33B so that any particular music or melody may be played and heard through the speaker 39, the music or melody may give the user a different impression of the visually changing patterns of the objects.

The volume of a sound through the speaker 39, the choice of music (melody), and the rate and tempo of playing the music may be controlled by the appropriate commands from the central controller 15.

The manually-operated handle 17 may be operated to rotate the pulley 35 which rotates the object cases 33A, 33B. By operating the handle 17 manually, the object cases 33A, 33B may be rotated at the desired rate, which may cause the objects therein to be moving around at the favorite tempo. Thus, those objects may appear as geometrical patterns that are changing at the favorite tempo.

In addition to moving the objects around within the object cases in accordance with the embodiment described above, there are other possible embodiments in which the objects are to be moved around. Some of those embodiments are described below.

(1) The object cases may be disposed movably (for example, the object cases 33A, 33B may be supported by any elastic element such as a spring), and a vibration supply device may be provided within the rectangular hollow box 10 so that it can be operated in response to an appropriate instruction or command from the central controller 15 in order to cause the object cases to vibrate or swing. The amplitude of the vibrations or swings caused by the vibration supply device may be controlled so that the objects can begin with moving around with small, quick vibrations, and then can gradually be moving around mildly, or vice versa. In this way, the geometric patterns produced by the objects and perceived visually may also begin with changing with small, quick motions, and then gradually may be changing mildly, or vice versa.

(2) An air supply device may be disposed within the rectangular hollow box 10, from which air may be delivered into the object cases. Specifically, the air supply device may be connected to the object cases, and may be operated in response to an appropriate instruction or command from the central controller 15. The air delivered from the air supply device into the object cases may cause the objects therein to be moving in various ways. In this case, an air outlet, which is designed so that the objects within the object cases will not escape through it, should be provided on each of the object cases. This air supply device may be combined with the vibration supply device. This embodiment is effective for those objects which are relatively light in weight.

(3) Objects may be made from ferromagnetic materials such as pieces of iron, or objects may be made containing the ferromagnetic substances. An electromagnet may be provided in proximity to each of the object cases that contain the such objects wherein the electromagnet may be conducted electrically, or may be energized or deenergized alternately and periodically with rotating, vibrating or swinging the object cases or without rotating, vibrating nor swinging the object cases. In either case, the objects may be moving linearly, and the patterns produced by those objects and perceived visually may be changing sharply. It is noted that the electromagnet may also be controlled by an appropriate command from the central controller 15.

(4) Objects may be made from dielectric material. An electrode may be provided in proximity to each of the object cases that contains the such objects wherein the electrode may be conducted electrically, or may be energized or deenergized alternately or periodically with rotating, vibrating or swinging the object cases or without rotating, vibrating nor swinging the object cases. In either case, the objects may be moving around. It is noted that the electrode may also be controlled by an appropriate command from the central controller 15.

(5) The objects may be magnetic, and may be moving electrically under the electrostatic action.

It may be understood from the foregoing description that according to the present invention, the speed and direction of rotation for the object cases, the amplitude and rate of vibrations or swings for the object cases, the rate of air delivered into the object cases, the alternate switching between the energizing and deenergizing of the electromagnet and electrode located in proximity to each of the object cases, the adjustment of the rate of electric conduction, the tempo and rate of music being played from the sound source, the volume of the sound, and the intensity and tone of the illumination by the light sources can be controlled centrally and concurrently by the central controller 15. This allows the objects to follow the various, complicate motions and movements, producing the variously changing geometric patterns that may appear beautiful by reflections in the mirrors forming the inner walls of the polygonal hollow cylinders 31A, 31B. Those geometric patterns may appear more beautiful as they are illuminated by the light sources 40, 40. Thus, the kaleidoscope according to the present invention provides the continually, beautifully, complicately and variously changing geometric patterns that may be observed visually as well as the acoustic effect produced by the sound source such as music, as compared with the prior art kaleidoscope that only provides the visual patterns. That is, the kaleidoscope according to the present invention provides both the visual and audio effects that can be enjoyed concurrently.

In addition to the before mentioned embodiments, the kaleidoscope according to the present invention may be also enjoyed visually without using the light sources 40, 40 by and through the following process. The one way is to use the objects having a coating of luminous paint that emits the visible ray when exposed to the ultraviolet ray such as blacklight. The other way is to use the objects which can continue to emit the visible ray for an extended period of time, once they are exposed to the ultraviolet ray.

In the embodiments described so far, it is noted that the visual objects such as pieces of colored paper, etc. within the object cases are moving freely, but in the kaleidoscope employing the rotating and swinging object cases, three-dimensionally formed cubic objects that are formed like flowers, balls, stars, and the like, for example, may be fixed immovably within the object cases. Such cubic objects may also appear as the continually changing patterns by reflection in the inner mirrors, as the object cases are rotated, vibrated or swung.

Furthermore, in the embodiments described so far, it is noted that the polygonal hollow cylinders 31A, 31B have the triangular cross section, but they may have the square, pentagonal, or other polygonal cross section that may produce more complicate visual patterns when the objects are moving around. This alternative embodiment may satisfy the visual needs of the user better.

Figure 5:
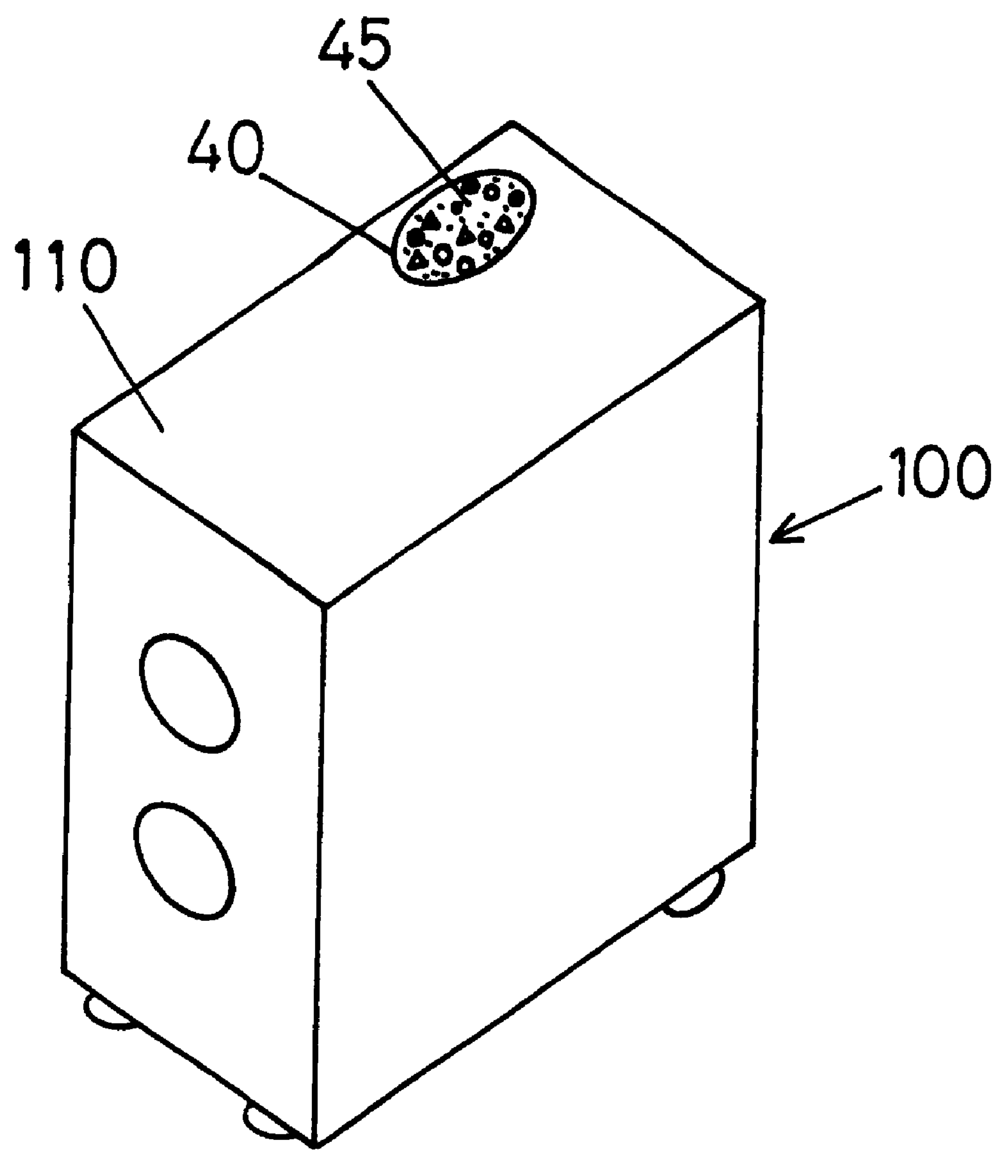
FIG. 5 is a perspective view illustrating an alternative preferred embodiment of the kaleidoscope according to the present invention.

As seen from FIG. 5, the kaleidoscope includes a perfume container 40 that is located on the top cover 110 of the hollow box 100. The perfume container 40 may contain any fragrant substances in a liquid or solid form, or potpourri 45, which diffuse an agreeable or attractive fragrance. Those fragrant substances may diffuse the agreeable smell when heated by the light sources 40 inside the hollow box 100. The perfume container 40 may be located inside the hollow box 100, and an outlet may be provided on the hollow box 100 through which the smell diffused from the fragrant substance may go out.

The kaleidoscope according to the present invention can stimulate the three human senses of sight, hearing and smell, and satisfy those needs concurrently. Thus, it can enhance the tastes of individuals, provide the improved relaxation effect, and may be used as an effective tool for the aromatherapy.

In the embodiments described so far, the sound source may include a tape recorder, compact disk (CD) player, minidisk (MD) player, any devices that reproduce the sounds stored in a semiconductor memory, or a music box.

According to the kaleidoscope of the present invention, the continually, complicately and variously changing patterns that are produced by moving the objects around in the complicate and various ways may be observed visually while the music and melody are being played acoustically. Thus, the kaleidoscope according to the present invention provides more pleasures and joys to the user.

According to the present invention, the objects may be moved around by operating the kaleidoscope either manually or electrically. Thus, the kaleidoscope according to the present invention may provide an improved easiness of operation, and may provide a broader range of application. Furthermore, the present invention provides the additional advantage in that it allows the user to observe the patterns produced by the objects being moved around while enjoying the agreeable smell diffused from the fragrant substance in the perfume container within the hollow box.

What is claimed is:

1. A kaleidoscope comprising:

a hollow box having at least one peephole on a first lateral side wall thereof;

at least one polygonal hollow cylinder having a first end and a second end opposite the first end, and inner surfaces forming mirror surfaces, said at least one polygonal hollow cylinder being disposed such that the first end of said at least one polygonal hollow cylinder is located opposite said at least one peephole;

a lens disposed inside said hollow box and interposed between the first end of said at least one polygonal hollow cylinder and said at least one peephole;

at least one object case containing visual objects formed of dielectric material, said at least one object case having a first lateral side and a second lateral side located opposite the first lateral side, said first lateral side of said at least one object case being disposed opposite said second end of said at least one polygonal hollow cylinder;

at least one light source disposed on an inner side of a second lateral side wall of said hollow box, the second lateral side wall being located opposite the first lateral side wall, said at least one light source being disposed opposite the second lateral side of said at least one object case;

an electrode for moving said visual objects formed of dielectric material contained in said at least one object case, wherein said electrode is disposed within said hollow box and located in proximity to said at least one object case, wherein said objects can be moved by electrically operating said electrode, by alternately energizing and deenergizing said electrode, or by periodically energizing said electrode;

a sound source disposed within said hollow box; and control means connected to said electrode, said at least one light source and said sound source, wherein said control means is operable to control the operation of said electrode, said at least one light source and said sound source.

2. The kaleidoscope as claimed in claim 1, wherein said sound source includes a tape recorder, a compact disk (CD) player, a minidisk (MD) player, or a semiconductor memory containing audio information.

3. The kaleidoscope as claimed in claim 1, further comprising a perfume container disposed in said hollow box.

4. The kaleidoscope as claimed in claim 1, further comprising means for rotating said at least one object case.

5. A kaleidoscope comprising:

a hollow box having at least one peephole on a first lateral side wall thereof;

at least one polygonal hollow cylinder having a first end and a second end opposite the first end, and inner surfaces forming mirror surfaces, said at least one polygonal hollow cylinder being disposed such that the first end of said at least one polygonal hollow cylinder is located opposite said at least one peephole;

a lens disposed inside said hollow box and interposed between the first end of said at least one polygonal hollow cylinder and said at least one peephole;

at least one object case containing ornamental objects formed of dielectric material and having a coating of luminous paint or a coating of fluorescent material, said at least one object case having a first lateral side disposed opposite said second end of said at least one polygonal hollow cylinder;

an electrode for moving said visual objects formed of dielectric material contained in said at least one object case, wherein said electrode is disposed within said hollow box and located in proximity to said at least one object case, wherein said objects can be moved by electrically operating said electrode, by alternately energizing and deenergizing said electrode, or by periodically energizing said electrode;

a sound source disposed within said hollow box; and control means connected to said electrode and said sound source, wherein said control means is operable to control the operation of said electrode and said sound source.

6. The kaleidoscope as claimed in claim 5, wherein said sound source includes a tape recorder, a compact disk (CD) player, a minidisk (MD) player, or a semiconductor memory containing audio information.

7. The kaleidoscope as claimed in claim 5, further comprising a perfume container disposed in said hollow box.

8. The kaleidoscope as claimed in claim 5, further comprising means for rotating said at least one object case.

* * * * *